(12) United States Patent
Deacon et al.

(10) Patent No.: US 10,570,708 B2
(45) Date of Patent: Feb. 25, 2020

(54) LANDING STRING MEASUREMENT SYSTEM AND METHOD INCLUDING A POWER ASSEMBLY PROVIDING POWER TO A DATA-STORAGE

(71) Applicant: Expro North Sea Limited, Dyce, Aberdeenshire (GB)

(72) Inventors: Paul Deacon, Inverurie (GB); Keith Taylor, Inverurie (GB)

(73) Assignee: Expro North Sea Limited, Dyce (GB)

( * ) Notice: Subject to any disclaimer, the term of this patent is extended or adjusted under 35 U.S.C. 154(b) by 123 days.

(21) Appl. No.: 15/566,942

(22) PCT Filed: Mar. 17, 2016

(86) PCT No.: PCT/GB2016/050720
§ 371 (c)(1),
(2) Date: Oct. 16, 2017

(87) PCT Pub. No.: WO2016/166505
PCT Pub. Date: Oct. 20, 2016

(65) Prior Publication Data
US 2018/0128085 A1 May 10, 2018

(30) Foreign Application Priority Data

Apr. 16, 2015 (GB) .................................. 1506496.7

(51) Int. Cl.
*E21B 41/00* (2006.01)
*E21B 47/09* (2012.01)
(Continued)

(52) U.S. Cl.
CPC .......... *E21B 41/08* (2013.01); *E21B 33/0355* (2013.01); *E21B 41/0014* (2013.01);
(Continued)

(58) Field of Classification Search
CPC .... E21B 33/0355; E21B 33/038; E21B 41/04; E21B 34/045; E21B 33/064; E21B 41/08;
(Continued)

(56) References Cited

U.S. PATENT DOCUMENTS 4,409,824 A * 10/1983 Salama ..................... G01L 1/22
73/152.48
5,127,261 A * 7/1992 Ingram ................... E21B 25/04
73/152.19
(Continued)

FOREIGN PATENT DOCUMENTS

WO WO2014064190 A2 5/2014

*Primary Examiner* — Lisa M Caputo
*Assistant Examiner* — Brandi N Hopkins
(74) *Attorney, Agent, or Firm* — Getz Balich LLC

(57) ABSTRACT

A landing string system and method therefor are provided. The landing string system has a measurement device with mechanical sensors that observe mechanical conditions associated with a landing string. Data-storage devices are in communication with the measurement device. The data-storage devices allow storage, from time to time, of data associated with the observed mechanical conditions. A power assembly provides power to the data-storage devices for at least an expected time of service of the system.

23 Claims, 5 Drawing Sheets

(51) Int. Cl.
*E21B 33/035* (2006.01)
*E21B 41/08* (2006.01)
*E21B 34/04* (2006.01)
*E21B 47/00* (2012.01)
*G01L 1/22* (2006.01)
*G01L 5/102* (2020.01)

(52) U.S. Cl.
CPC ............ *E21B 47/09* (2013.01); *E21B 34/045* (2013.01); *E21B 47/0006* (2013.01); *G01L 1/2218* (2013.01); *G01L 5/102* (2013.01)

(58) Field of Classification Search
CPC .. E21B 47/09; E21B 47/0006; E21B 41/0014; E21B 41/00; E21B 17/015; G01L 1/2218; G01L 5/102; G01L 3/108; G01L 9/0002; G01B 21/32
See application file for complete search history.

(56) References Cited

U.S. PATENT DOCUMENTS

| | | | |
|---|---|---|---|
| 6,835,291 B2* | 12/2004 | Hudson | C23F 13/22 204/196.09 |
| 6,865,139 B2* | 3/2005 | Hudson | G01V 1/3835 367/131 |
| 9,022,102 B2* | 5/2015 | Hudson | E21B 34/066 166/373 |
| 9,518,444 B2* | 12/2016 | Thompson | E21B 34/10 |
| 9,932,815 B2* | 4/2018 | Flight | E21B 17/01 |
| 2002/0189806 A1 | 12/2002 | Davidson et al. | |
| 2005/0103123 A1 | 5/2005 | Newman | |
| 2008/0303382 A1 | 12/2008 | Edwards, Jr. et al. | |
| 2014/0245838 A1* | 9/2014 | Nagano | G01L 1/005 73/767 |
| 2016/0138355 A1 | 5/2016 | Rytlewski | |

* cited by examiner

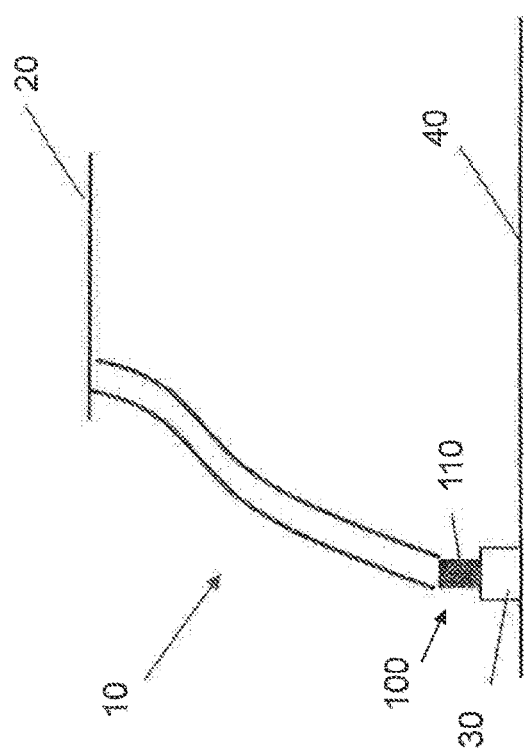
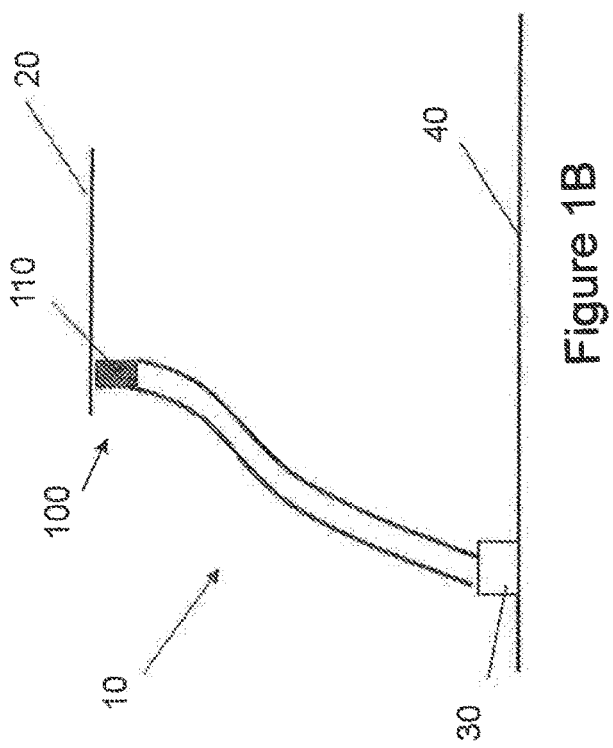

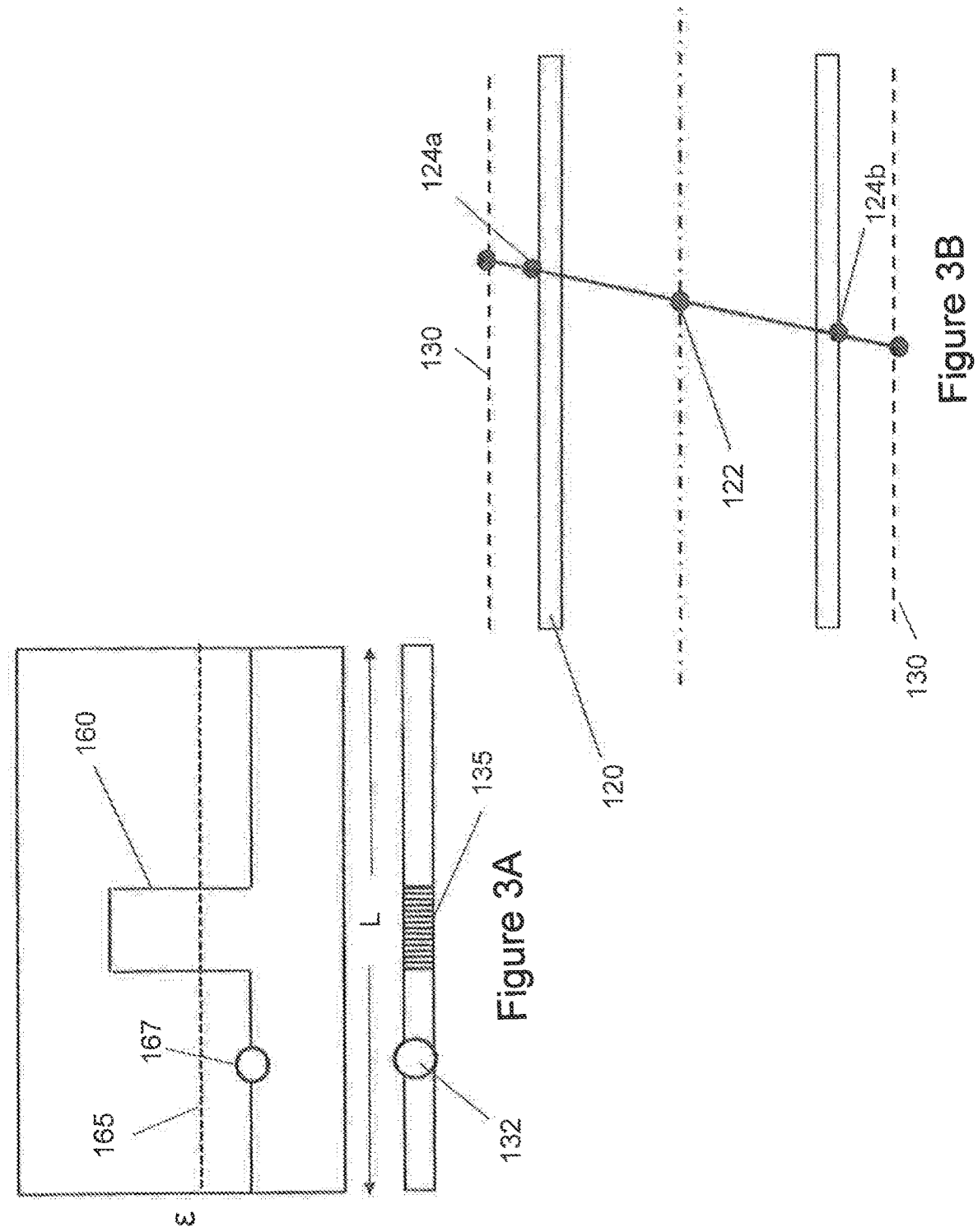

ure mechanical conditions over a second range. In some
LANDING STRING MEASUREMENT SYSTEM AND METHOD INCLUDING A POWER ASSEMBLY PROVIDING POWER TO A DATA-STORAGE This application claims priority to PCT Patent Appln. No. PCT/GB2016/050720 filed Mar. 17, 2016, which claims priority to GB Patent Appln. No. 1506496.7 filed Apr. 16, 2015, which are herein incorporated by reference.

BACKGROUND OF THE INVENTION

1. Technical Field

Some described examples relate to measurement systems and methods, particularly for use with landing strings (for example, in riser systems). In some examples, the systems can be configured to determine properties of landing strings, such as environmental and/or mechanical usage properties.

2. Background Information

Focusing on cost/lifespan of components used in well operations, particular those used offshore, is key to driving efficiencies and maintaining safety standards. While designed for use within particular operational parameters, it not uncommon for such components to be used across a variety of different environments and working conditions, as well as varying durations of service. This is true of landing strings, and in particular riser systems, such as completion and/or workover risers.

For compensating for wave induced distance changes from the seabed to the floating platform, a heave compensation system is typically employed. Failure of a heave compensation system is a serious catastrophic incident that may have grave consequences for the personnel on the rig and the equipment. For instance, if the heave compensation system of a rig fails, the pipe string may be severed as a result of being subjected to excessive forces. In such situations, the severed upper part of the pipe string may eject through the rotary table of the rig high up over the rig floor with obvious risks to personnel and rig equipment.

This background serves only to set a scene to allow a skilled reader to better appreciate the following description. Therefore, none of the above discussion should necessarily be taken as an acknowledgement that the discussion is part of the state of the art or is common general knowledge.

SUMMARY OF THE INVENTION

Some described examples relate to landing string system and methods. The system and method may permit monitoring and/or measurement of in-service components, which may assist with maintenance, safety, design verification, etc.

In some examples, there is described a landing string system comprising one or more measurement devices. Each measurement device may comprise one or more mechanical sensors configured to observe mechanical conditions associated with a landing string. The measurement device may comprise mounting components at which the one or more sensors may be provided.

The system may also comprise a data-storage device in communication with the measurement device. The data storage device may be configured to store, from time to time, data associated with the observed mechanical conditions. For example, the data-storage device may be configured to store data during the time that a landing string is in service.

"In service", in the context here, may include, among other things, pre and/or post-deployment (for example, during transportation) as well during deployment (for example, when deployed between surface and seabed). Mechanical-condition data may be considered to be the data associated with or related to the data stored at the data-storage device, from the mechanical sensors of the measurement device. In some embodiments, a data-storage device may include a processing apparatus which may be in communication with one or more sensors or other type input devices.

The system may comprise a power assembly configured to provide power to the data-storage device. The power assembly may be configured to provide power for at least an expected time of service of the system, or indeed landing string. For example, the power assembly may comprise a power storage unit, such as a batter pack, fuel cell, or the like, configured to provide power to the data-storage device and/or measurement device.

The measurement device may comprise a main body portion or section (for example a pipe section). The body portion may have an axial length and a cross-section. In some examples, the body portion may be configured as a cylindrical pipe. End regions of the body portion may be configured to couple or connect to a landing string or the like (e.g. retainer valve, lubricator valve, subsea test tree, riser-control module, crossover, annular-slick joint, or the like). In some examples, such end regions may be threaded or the like for connection.

In such examples, the measurement device may be configured as an intermediate joint (for example, in a similar manner to a spacer pup or crossover joint). In other similar words, the measurement device, and indeed system, may be configured to couple or otherwise connect between portions of a landing string, or between a landing string and other proximate components (for example, retainer valve, lubricator valve, etc.). In such cases, when in use, the system may be considered to be integrally formed as a landing string assembly.

In the alternative, at least some of the system, or indeed measurement device, may be configured to mount with a landing string. For example, the system may be configured to clamp on, or otherwise be restrained, at, or on, a portion of landing string.

The measurement device may comprise mounting components that are spaced along the body portion (for example, axially spaced along a pipe section). The mechanical sensors may be coupled or otherwise fixed between the mounting components of the measurement device. In some examples, the mounting components may be configured as flange portions. Such flange portions may extend radially from the body portion. The mounting components may be considered to be fixed with respect to the body section, such as being rigidly fixed.

The measurement device may comprise at least first and second sensor arrangements. One or both of the sensor arrangements may be configured to measure mechanical conditions associated with a landing string. In some examples, the first and second sensor arrangements may be configured to measure similar or the same mechanical conditions.

The first sensor arrangement may have a first particular measurement range. That is to say that the first sensor arrangement may be able to measure mechanical conditions over a first range. The second sensor arrangement may have a second particular measurement range. That is to say that the second sensor arrangement may be configured to measure mechanical conditions over a second range. In some examples, the first range may be different from the second range. The first range may be smaller than the second range. The first range may lie within the second range.

In some examples, the first and second ranges may be the same, or substantially the same. In such examples, the first and second sensor arrangements may operate redundantly of one another. In other similar words, one sensor arrangement may be used to corroborate data provided from the other, or be used in the event of failure of the other.

In some examples, the data-storage device may comprise a first data store and a second data store. The first and second data stores may be in communication with first and second sensors arrangements, respectively. In such cases, each data store may be configured to store associated with each respective sensor arrangement. Alternatively, the first and second data stores may be in communication with both first and second sensors arrangements, and configured to store data from each sensor (for example, cumulatively). Again, such an arrangement may provide system redundancy.

The mechanical sensors, for example the first and second sensor arrangements, may be configured to measure tension, bending, pressure, and/or temperature or the like.

The mechanical sensors may be configured to measure strain between the mounting components, for example, in the event of relative displacement or movement of the body section/mounting components (for example, relative displacement or movement in service). Each mechanical sensor may comprise a strain sensor together with a compliant section. The compliant section may be configured to deform, under load/displacement, to avoid excess strain across any particular mechanical sensor.

In some examples, each of the mechanical sensors associated with a sensor arrangement, may be positioned at regular intervals with respect to each other. For example, in some cases, each sensor arrangement may comprise a plurality mechanical sensors (for example, four sensors), which may be spaced equidistantly around the body portion.

The sensors and/or data-storage devices may be housed within a casing. The casing may be in the form of an outer shielding or cowling, surrounding some of all of the body section of the measurement device.

In some examples, the system may additionally comprise a monitoring system. The monitoring system may comprise a processor module and a memory module, in communication with one another. The monitoring system may comprise a database, or be in communication with a database. The database may be configured to store at least mechanical-condition data associated with one or more landing strings. The monitoring system may be in communication with the data-storage device (for example, first and second data stores), and configured to receive (for example, download and/or store) obtained mechanical-condition data.

The monitoring system may be provided in proximity to the measurement device and/or data-storage device (for example, being provided at the body section), or may be remotely located (for example, at surface). The monitoring system may be configured to receive mechanical-condition data via a communication connection that is wired, wireless, or combination thereof. Wireless, in this context, includes methods of communication that comprise non-electromagnetic signals, such acoustics or other such pressure pulses.

The monitoring system may be configured to use mechanical-condition data obtained from the sensors/data-storage device to determine—for example regressively determine—mechanical conditions at other regions associated with the body section of the measurement device. Such analysis may provide "local data". That is to say that local data may include data associated with the mechanical condition of the body section, an axial approximation of the body section, the mounting components, or the like.

In other examples, the monitoring system may be configured to determine—for example regressively determine—mechanical conditions at regions beyond the measurement device. Such analysis may provide "global data". That is to say, global data may be considered to be data associated with the mechanical conditions of the landing string at and/or beyond the body section of the measurement device.

In some examples, the monitoring system may be configured to calculate, approximate, or estimate local data of the body section, and/or global data of further sections of the landing string from the mechanical-condition data measured from the mechanical sensors. In some examples, this may include interpolating and/or extrapolating data so as to provide local and/or global data.

For example, in some cases, where the body section of the measurement device has been positioned, in service, at a region of expected peak tension, bending, or the like, then the monitoring system may be configured to assign, and store, the same or similar peak mechanical conditions as global data to the remainder of that landing string. Similarly, where the body section of the system is positioned, in service, at a region of reduced local mechanical condition, compared to the global conditions, then the monitoring system may be configured to calculate, approximate or estimate global data based on the mechanical conditions observed locally. In some cases, this may include assigning a particular weighting to the sensed mechanical conditions so as to provide global data.

In some examples, the measurement system may comprise a plurality of measurement devices, each having corresponding data-storage devices and power connections.

Some of all of the plurality of measurement devices may be in communication with one or more monitoring systems. In such examples, the monitoring system may store and accumulate global data from a plurality of local data sources.

The measurement system may be configured for use during service such that mechanical-condition data may be generated and stored during service (for example, at the data-storage device), and then communicated subsequently (for example, after service) to the monitoring system. Alternatively, the mechanical-condition data may be communicated from time to time during the service of the system.

Upon receipt of mechanical-condition data—which may be in the form of local/global data—the monitoring system may be configured to use that received mechanical-condition data together with one or more threshold conditions to provide an indication of the suitability of service of a landing string. The threshold conditions may include absolute magnitude values (e.g. maximum tension, bending etc.). The threshold conditions may include cumulative values (e.g. maximum hours of service at, or above, a particular tension bending).

The monitoring system may be configured to use mechanical-condition data—which may be in the form of local and/or global data—to provide an indication as to suitability of service of a particular landing string, and/or a group of landing strings. For example, the monitoring system may be configured to compare one or more threshold values with mechanical-condition data from a particular landing string, and then associate a determined or calculated suitability of service with further landing strings (which may or may not be equipped with measurement devices). Such further landing strings may have been assessed to have been deployed in the same of similar environment for the same or similar duration.

The landing string system may be configured to initiate an action event, for example, after determining suitability of service. For example, after comparing one or more threshold conditions with mechanical-condition data, the system may be configured to communicate an action signal. The action signal may be communicated when a threshold condition has been exceeded, or is expected to be exceeded. The action signal may be communicated when a threshold condition is close to being exceeded.

That action signal may be communicated to the landing string (or systems associated with the landing string). Such a signal may be configured to initiate a shut down at the landing string. For example, such an initiated shutdown may close valves to shut-in well bore fluid, and then disconnect from the well.

The monitoring system may comprise a user interface, configured to provide a user with the ability to augment or input data. Similarly, the user interface may permit a user to be visually informed as to the suitability of one or more particular landing strings. The system may be configured to communicate (e.g. display) an action event to a user. An action event may include a shut down, but also may include recommendations for subsequent use (e.g. not to be used for in excess of 48 hours).

According to further described example, there is described a landing string system comprising: a measurement device comprising one or more mechanical sensors configured to observe mechanical conditions associated with a landing string, a data-storage device in communication with the measurement device, the data storage device configured to store, from time to time, data associated with the observed mechanical conditions, and a power assembly configured to provide power to the data-storage device for at least an expected time of service of the system. In some embodiments, a landing string system as described herein may include a processing apparatus which may be in communication with the one or more sensors and/or other type input devices and the data storage device.

According to a further described example, the is provided a method of measuring mechanical-condition data associated with a landing string, comprising observing mechanical conditions associated with a landing string using a measurement device comprising one or more mechanical sensors; and storing, from time to time, mechanical-condition data at a data-storage device.

According to a further example, there is described a method for determining the suitability of service of one or more landing strings.

The method may comprise obtaining data from a landing string data-storage device. The data provided by the data-storage device may have been obtained by the data-storage device, from time to time, while in service, from a measurement device associated with the landing string. Such measurement devices may comprise one or more sensors configured to observe the mechanical condition indicative of a landing string.

Such a data-storage device may be configured to store, from time to time, data associated with the observed mechanical conditions. For example, the data storage device may be configured to store data during the time that a landing string is in service. "In service" may include pre and/or post-deployment (for example, during transportation) as well during deployment (for example, when deployed between surface and seabed).

The method may comprise storing the obtained mechanical-condition data; and using the mechanical-condition data together with one or more threshold conditions, the threshold conditions providing an indication as to suitability of service of a landing string.

The method may comprise receiving at a monitoring system, obtained mechanical-condition data having been stored at a data-storage device. The method may comprise receiving mechanical-condition data via a communication connection that is wired, wireless, or combination thereof. Wireless, in this context, includes methods of communication that comprise non-electromagnetic signals, such acoustics or other such pressure pulses.

The method may comprise using mechanical-condition data obtained from sensors/data-storage device to determine—for example regressively determine—mechanical conditions at other regions associated with the landing string (or indeed the measurement device). Such analysis may provide "local data". That is to say that local data may include data associated with the mechanical condition of a body section of the measurement device.

In other examples, the method may comprise determining or calculating—for example regressively determining/calculating—mechanical conditions at regions beyond the measurement device. Such analysis may provide "global data". That is to say, global data may be considered to be data associated with the mechanical conditions of the landing string at and/or beyond the body section of the measurement device.

The method may comprise calculating, approximating, or estimating local data of the body section, and/or global data of further sections of the landing string from the mechanical-condition data measured from the mechanical sensors. In some examples, this may include interpolating and/or extrapolating data so as to provide local and/or global data.

For example, in some cases, where the body section of the measurement device has been positioned, in service, at a region of expected peak tension, bending, or the like, then the method may include assigning, and storing, the same or similar peak mechanical conditions as global data to the remainder of that landing string. Similarly, where the body section of the system is positioned, in service, at a region of reduced local mechanical condition, compared to the global conditions, then the method may include calculating, approximating or estimating global data based on the mechanical conditions observed locally. In some cases, this may include assigning a particular weighting to the sensed mechanical conditions so as to provide global data.

The method may comprise accumulating global data from a plurality of local data associated with the mechanical condition of a plurality of measurement devices.

Upon receipt of mechanical-condition data—which may be in the form of local/global data—the method may comprise using that received mechanical-condition data together with one or more threshold conditions to provide an indication of the as to suitability of service of a landing string. The threshold conditions may include absolute magnitude values (e.g. maximum tension, bending etc.). The threshold conditions may include cumulative values (e.g. maximum hours of service at, or above, a particular tension bending).

The method may comprise using mechanical-condition data—which may be in the form of local and/or global data—to provide an indication as to suitability of service of a particular landing string, and/or a group of landing strings. For example, the method may comprise comparing one or more threshold values with mechanical-condition data from a particular landing string, and then associating a determined or calculated suitability of service with further landing strings (which may or may not be equipped with measurement devices). Such further landing strings may have been assessed to have been deployed in the same of similar environment for the same or similar duration.

The method may comprise initiating an action event, for example, after determining suitability of service. For example, after comparing one or more threshold conditions with mechanical-condition data, the method may comprise communicating an action signal. Such an action signal may be communicated when a threshold condition has been exceeded, or is expected to be exceeded. The action signal may be communicated when a threshold condition is close to being exceeded.

The method may comprise communicating an action signal to a landing string (or systems associated with the landing string). Such a signal may be configured to initiate a shut down at the landing string. For example, such an initiated shutdown may close valves to shut-in well bore fluid, and then disconnect from the well.

The method may comprise providing to a user, via a user interface, the suitability of one or more particular landing strings. The method may comprise communicating (e.g. displaying) an action event to a user. An action event may include a shut down, but also may include recommendations for subsequent use (e.g. not to be used for in excess of 48 hours).

According to a further example, there is described a method for determining the suitability of service of one or more landing strings, comprising: obtaining data from a landing string data-storage device, the data having been obtained by the data-storage device from time to time, while in service, from one or more sensors configured to observe the mechanical condition indicative of the landing string; storing the obtained mechanical-condition data; and using the mechanical-condition data together with one or more threshold conditions, the threshold conditions providing an indication as to suitability of service of a landing string.

In some examples, there is provided a computer program product or computer file configured to at least partially (or fully) implement the system and methods as described above.

In some examples, there is also provided a carrier medium (e.g., a non-transitory computer readable medium) comprising or encoding the computer program product or computer file. In some examples, there is also provided processing apparatus when programmed with the computer program product described. Some of the above examples may implement certain functionality by means of software, but also that functionality could equally be implemented solely in hardware (for example by means of one or more ASICs (application specific integrated circuit) or Field Programmable Gate Arrays (FPGAs)), or indeed by a mix of hardware and software (e.g. firmware). As such, the scope of aspects of the present disclosure should not be interpreted as being limited only to being implemented in software.

Aspect described may include one or more examples, embodiments or features in isolation or in various combinations whether or not specifically stated (including claimed) in that combination or in isolation. It will be appreciated that one or more embodiments/examples may be useful with measuring landing strings. The above summary is intended to be merely exemplary and non-limiting.

BRIEF DESCRIPTION OF THE DRAWINGS

A description is now given, by way of example only, with reference to the accompanying drawings, in which: —

FIGS. 1A and 1B show examples of a landing string comprising a measurement device;

FIG. 3A shows exemplary strain distribution along the mechanical sensor of FIG. 2A, and FIG. 3B shows exemplary analysis from the data from FIG. 3A;

DETAILED DESCRIPTION OF THE INVENTION

Figure 2B:
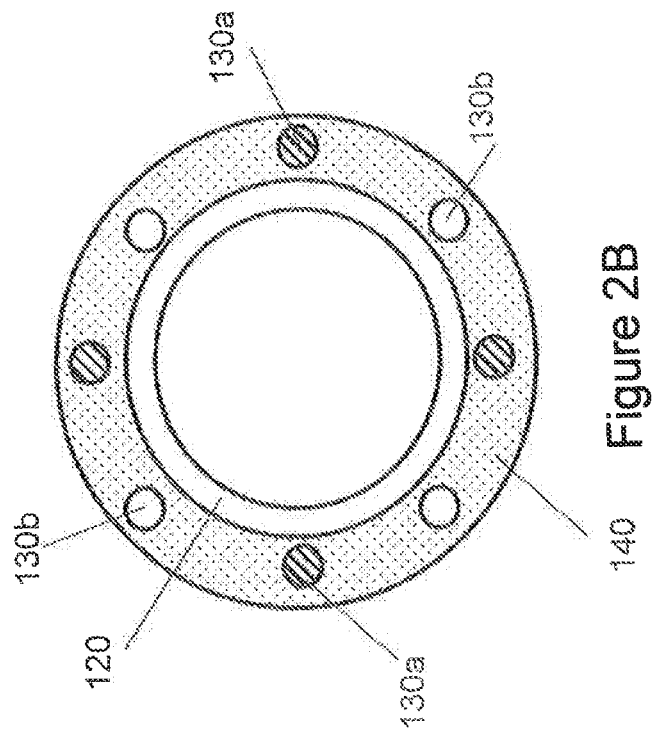
FIG. 2B shows a cross-section through A-A in FIG. 2A.

While some of the following examples are described with reference specifically to systems, devices and methods for riser landing strings (e.g. completion and/or workover risers), it will nevertheless be appreciated that certain aspects of the described examples may equally be used beyond such riser landing strings.

Similarly, while the described examples relate to landing string system and methods that permit monitoring and measurement of in-service components, improvement on efficiencies and maintenance of safety standards, it will nevertheless be appreciated that further benefits and advantages are disclosed and/or would be apparent to a skilled reader.

FIG. 1A shows an example of a landing string 10 extending from surface 20 to seabed 40. At surface, there may be provided a vessel, offshore rig or the like (not shown for ease). Here, the landing string 10 is coupled at the seabed 40 using a measurement device 110 of a landing string system 100 and an interface component 30. Here, the interface component 30 is configured as a retainer valve, but in other cases may comprise a one or more components, including components configured as a lubricator valves, subsea test trees, riser control modules, crossovers, annular slick joints, or the like.

Here, the system 100—and more particularly, the measurement device 110 of the system 100—comprises a body section 120 (see FIG. 2) that is essentially configured as an intermediate joint, or the like. The body section 120 is intended to be integrally fixed between the remainder of the landing string 10 and, in this particular case, the interface component(s) 30 (e.g. retainer valve). FIG. 1B shows an alternative example in which the measurement device 110 is positioned proximate the surface (e.g. at a vessel). As will be appreciated when considering the following description, the measurement device 110 of the landing string system 100 may be positioned at any, or even at a plurality, of positions along the landing string.

Figure 2C:
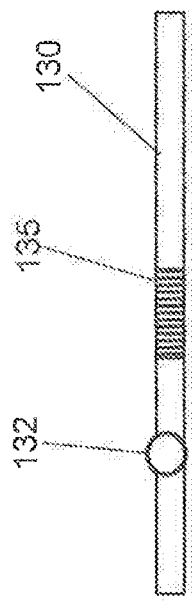
FIG. 2C shows mechanical sensor of the device of 2A.
Figure 2A:
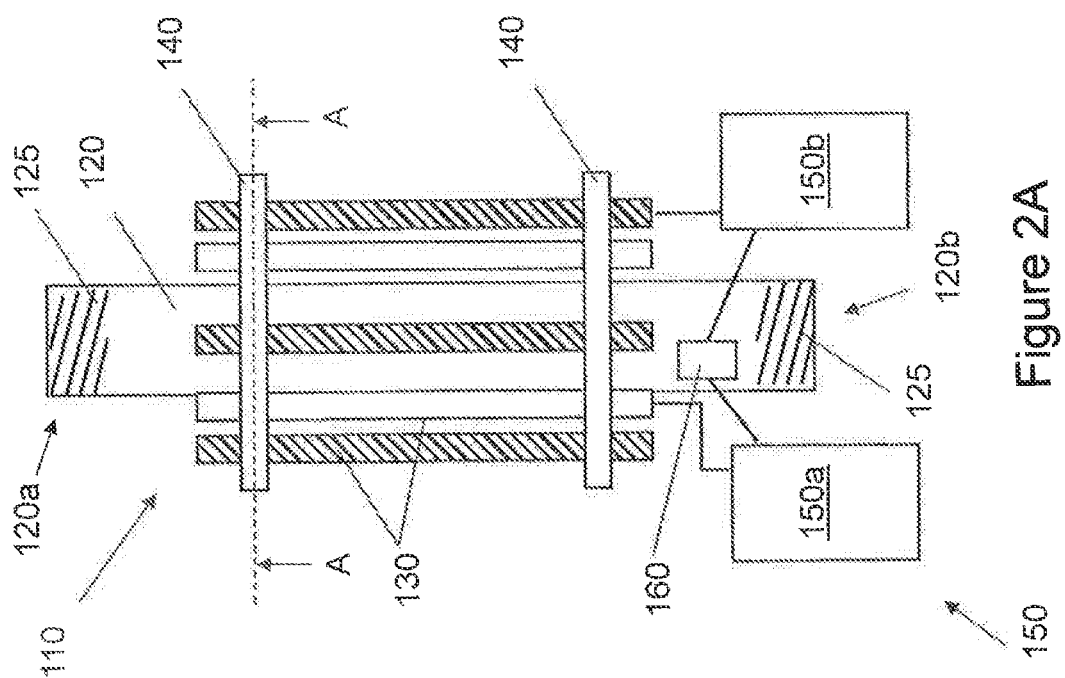
FIG. 2A shows an example of a measurement device of a landing string system.

FIG. 2A shows in more detail the measurement device 110 of the landing string system 100. FIG. 2B shows the device 110 through section A-A of FIG. 2A.

The body section 120 of the measurement device 110 has an axial length and a cross-section and, in this case, is essentially configured as a cylindrical pipe. End regions 120*a*, 120*b* of the body portion 120 are configured to couple or connect to the landing string 10 or the like (e.g. the retainer valve 30). In this particular example, the end regions 120*a*, 120*b* are shown as threaded 125, but of course other connections may be used. As mentioned, this allows the measurement device 110 to be provided as an intermediate joint (for example, in a similar manner to a spacer pup or crossover joint).

While here the measurement device 110, and indeed the system 100, may be considered to be integrally formed as a landing string assembly, in the alternative, at least some of the system 100, or indeed measurement device 110, may be configured to mount with a landing string 10. For example, the system may be configured to clamp on, or otherwise be restrained, at, or on, a portion of landing string 10 as will be appreciated given the following description.

In FIGS. 2A and 2B, the measurement device 110 is also shown comprising a plurality of mechanical sensors 130 configured to observe mechanical conditions associated with the landing string 10. Here, each mechanical sensor 130 of the measurement device 110 is positioned at regular intervals with respect to each other. In this example, the sensors 130 are spaced equidistantly around the body portion 120.

The mechanical sensors 130 are coupled or otherwise fixed between two mounting components 140 of the measurement device 110. Those mounting components 140 are spaced along the body portion 120, and in this case axially spaced along the body portion 120 from one another. Here, the mounting components 140 are configured as flange portions, extending radially from the body portion 120. The mounting components 140 can be considered to be rigidly fixed with respect to the body section 120. In this case, the mechanical sensors 130 are configured to measure the relative distance or displacement between the two mounting components or, more specially, any change in relative displacement between the two mounting components 140. In some examples, this is achieved using mechanical sensors 130 comprising strain sensors 132.

FIG. 2C shows one example of a mechanical sensor 130 of the measurement device 110. Here, the sensor 130 is configured to measure strain between the mounting components 140 and comprises such a strain sensor 132. In this example, the sensor 130 additionally comprises a compliant section 135. The compliant section 135 is specifically configured to deform, under load/displacement, to avoid excess strain across any particular mechanical sensor 130 or measurement device. Here, the compliant section 135 is elastically deformable across the expected measurement loads/displacements of the device 110. The strain sensor 132 is specifically contained within a section of the sensor 130, such that strain experienced by the strain sensor 132 will be less than that of the compliant section 135. However, nevertheless observing the strain at the strain sensor 132 and together with having an understanding of the properties of the compliant section 135 can permit a determination of the strain experienced by the mechanical sensor between the mounting components 140 (as will be described in more detail with reference to FIG. 3A).

It will be appreciated that the measurement device 110 (e.g. in some cases, the mechanical sensor 130) may be configured to determine additional mechanical properties such as temperature, pressure or the like. The temperature and/or pressure may relate to environmental conditions external to the landing string (e.g. associated with surrounding water if open to those conditions), and/or environmental conditions within the landing string (e.g. associated with fluids passing through the landing string). In such cases, the mechanical-condition data may also include data associated with those properties.

Here, the system 100 further comprises a data-storage device 150 in communication with the measurement device 110. As shown in FIG. 2A, particular to this example, the data-storage device comprises a first data store 150a and a second data store 150b as will be further explained.

The data-storage device 150 is in communication with the mechanical sensors 130 and is configured to store, from time to time, data associated with the observed mechanical conditions from the sensors 130. In this particular example, the data-storage device 150 is configured to store data during the time that a landing string 10 (or at least the measurement device 110) is in service. "In service", in the context here, can include, among other things, pre and/or post-deployment (for example, during transportation) as well during deployment (for example, when deployed between surface and seabed).

Mechanical-condition data can be considered to be the data obtained, associated with, or indeed related to, the data stored at the data-storage device 150 from the mechanical sensors of the measurement device 110. While not shown here, nevertheless mechanical-condition data can include other data, such a temperature or pressure data associated with the in-service and/or environmental conditions.

Figure 4A:
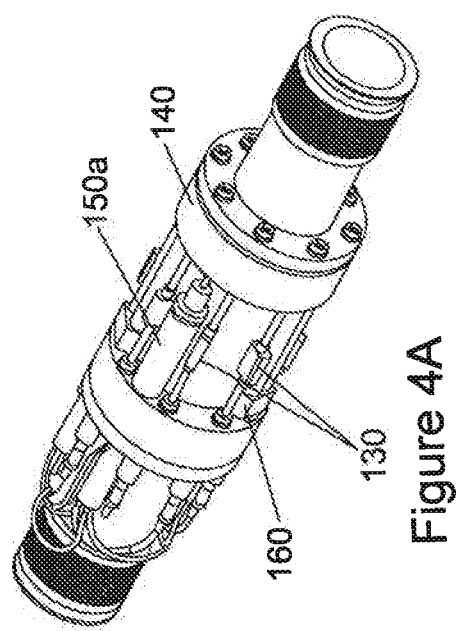
FIGS. 4A and 4B show perspective views of the measurement device of FIG. 2A.

While the data-storage device 150 may be positioned remotely from the measurement device 110, in this example the data-storage device 150 is positioned at the body portion 120 (as is shown more clearly in FIG. 4A). The system 100 further comprises a power assembly 160 configured to provide power to the data-storage device 150. In this particular example, the power assembly 160 comprise a power storage unit, such as a batter pack, fuel cell, or the like, configured to provide power to the data-storage device 150 and/or measurement device 110. Additionally, or alternatively, the power assembly 160 may comprise one or more connectors, specifically configured to connect the power assembly to a power supply (for example a power supply from surface via an umbilical or the like) from which the power assembly may then power the data-storage device and/or measurement device.

In use, when the system 100 is comprised with a landing string, tension, bending, etc., experienced by the landing string 10 and at the measurement device 110 will result in relative displacement between the two mounting components 140.

Because the overall stiffness of the mechanical sensors 130 may vary along their length, L, any instantaneous strain measured may also vary along the length, L, of the sensors 130. This is particularly so in the example here where the mechanical properties, and elasticity, of the compliant section differ from the remainder of the mechanical sensor 130.

FIG. 3A shows an exemplary and simplified representation of the instantaneous stain 160 along the mechanical sensor 130, together with the average strain 165 (e.g. calculated average strain). For ease of reference, the mechanical sensor 130 shown in FIG. 2C is represented along the x-axis shown in FIG. 3A. Here, the strain sensor 132 measures a particular value of strain 167 at the position along the sensor. Having an understanding of the expected corresponding strain at the compliant section, permits a calculation of the average strain experienced along the sensor 130. Put differently, the average strain 165 would be the strain experienced by the mechanical sensor 130 were the complaint section 13 to have been omitted. The average strain 165 relates to the total change in sensor 130 length divided by the original sensor length.

Once the average strain in the mechanical sensor 130 is known (or calculated), pairs of sensors 130—for example those 180° apart—may be used to evaluate the strains due to tension, compression and/or bending at the measurement device 110. Of course, in some example while multiple "pairs" of sensors 130 can be used to determine accurately the mechanical conditions (e.g. bending, etc.) at the device 110—as is the case exemplified in FIGS. 2A and 2B—in other examples, it will be appreciated that further groupings of sensors 130 may be used. For example, groupings of three sensors 130 may be used. In such cases, and for ease of calculation, those sensor 130 may be spaced equidistantly around the body portion 120.

In any event, the sensors 130 can be used to measure longitudinal and bending strain in two orthogonal directions and as a result, bending moments and the like can be determined around the body portion 120 (e.g. 360 degrees around the bending portion).

As mentioned above, the mounting components 140 are configured to be stiff, or rigid, with respect to the remainder of the measurement device 110. Therefore, in use, and during times of relative movement the mounting components 140 may remain plane. As such, calculations, estimations or the like (e.g. regressive analysis, and in particular in this example interpolation, such as linear interpolation) can be used between the strain readings of each pair of mechanical sensors.

The average (interpolation to the centerline 122 of the body portion 120) based on pairs of mechanical sensors 130 can provide the tension and/or compression membrane strain. Interpolation to the body portion 120 outer wall diameter 124a, 124b based pairs of mechanical sensor strains can provide the tension/compression plus bending and minus bending strains. In this example, the bending component can be isolated by subtracting the membrane component from the membrane plus bending. With the membrane and bending strains in the body portion determined, then these can be converted to loads acting on the body portion of the measuring device at the location of the measuring device.

For example, if stresses in the body portion (e.g. the wall of the body portion 120) remain linearly elastic, then based on linear strains, the forces can be found using:

$$F = \varepsilon_m EA$$

and $$M = \frac{\varepsilon_b EI}{y}$$

Here, F is the tension/compressive force at the measurement device 110, M is the bending moment at the measurement device 110, $\varepsilon_m$ is the membrane strain $\varepsilon_b$ is the bending strain, E is the Young's Modulus, A is the cross sectional area, I is the second moment of area and y is the distance from the neutral axis to the body portion 120 outer diameter.

In such a way, data obtained from the sensors 130 can be used to calculate or estimate—for example regressively determine—mechanical conditions at other regions associated with the body section 120 of the measurement device 110. Such analysis can be considered to provide "local data". That is to say that local data can include data associated with the mechanical condition of the body section 120, an axial approximation of the body section 120, outer components, or the like. This local data may provide a good indication as to the forces, stresses, etc. that the measurement device 110, and thus the landing string 10, experiences during service. Such data may be valuable in weak-link analysis or the like, as will be further described.

In some examples, local data may be stored at the data-storage device 150. In such cases, the data-storage device 150 may be configured to calculate local data from mechanical-condition data observed from the sensors 130. Otherwise, the data-storage device 150 may store mechanical-condition data relating to readings from the mechanical sensors, which can be used subsequently (e.g. downloaded after use) for subsequent generation of local data.

In the example shown in FIGS. 2A and 2B, the measurement device 110 is further exemplified as comprising at least first and second sensor arrangements 130a, 130b. Here, both sensor arrangements 130a, 130b are configured to measure mechanical conditions associated with a landing string, as mentioned above. However, the first sensor arrangement 130a has a first particular measurement range—that is to say that the first sensor arrangement is able to measure mechanical conditions over a first range. The second sensor arrangement has a second particular measurement range—that is to say that the second sensor arrangement is configured to measure mechanical conditions over a second range.

In some examples, the first range may be different from the second range. The first range may be smaller than the second range and, indeed, the first range may lie within the second range. In such a way, a narrow range may be measured with higher accuracy (for example, to capture the normal operations with good accuracy), while a wide range with perhaps lower accuracy may be measured (for example, to ensure accidental events are captured albeit with less accuracy).

Of course, additionally/alternatively the first and second sensor arrangements 130a, 130b may operate redundantly of one another. In other similar words, one sensor arrangement 130a may be used to corroborate data provided from the other, or be used in the event of failure of the other. In such cases, the first and second ranges may be the same, or substantially the same.

As is shown in FIG. 2A, in such circumstances, the data-storage device 150 may comprise a first data store 150a and a second data store 150b in communication with first and second sensors arrangements 130a, 130b, respectively. In such cases, each data store 150a, 150b may be configured to store data associated with each respective sensor arrangement. Alternatively, the first and second data stores 150a, 150b may be in communication with both first and second sensors arrangements 130a, 130b, and configured to store data from each sensor (for example, cumulatively). Again, such an arrangement may provide system redundancy.

Figure 4B:
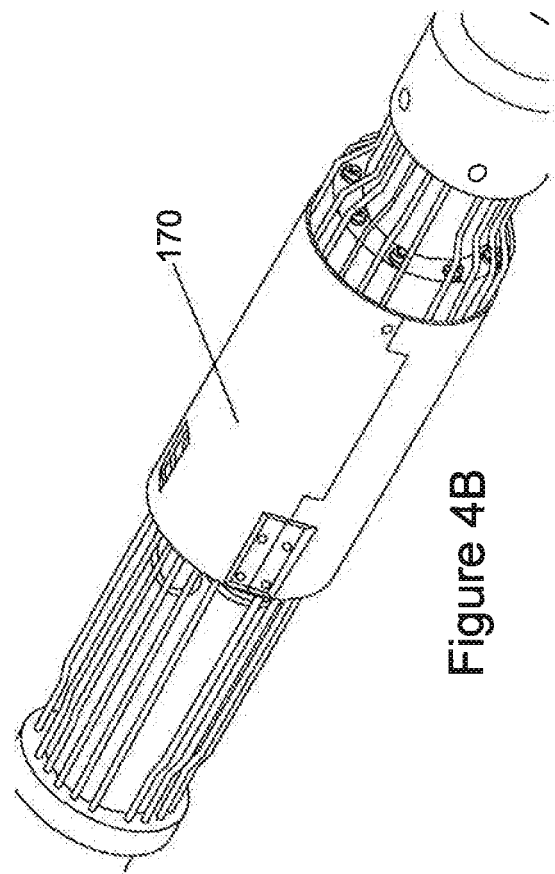

FIG. 4A shows a perspective view of the measurement device 110 of the system 100, wherein the body portion 120, mechanical sensors 130, mounting components 140, power assembly 160, etc. are shown. FIG. 4B shows the device 110 in which the sensors, data-storage devices, etc. are housed within a casing 170. Here, the casing 170 is in the form of an outer shielding or cowling, surrounding some of all of the body section 120 of the measurement device 110.

In the above example, mechanical-condition data (whether strains or indeed calculated local data) can be stored during service for subsequent use. In some examples, such data may be received by a monitoring system 200.

Figure 5:
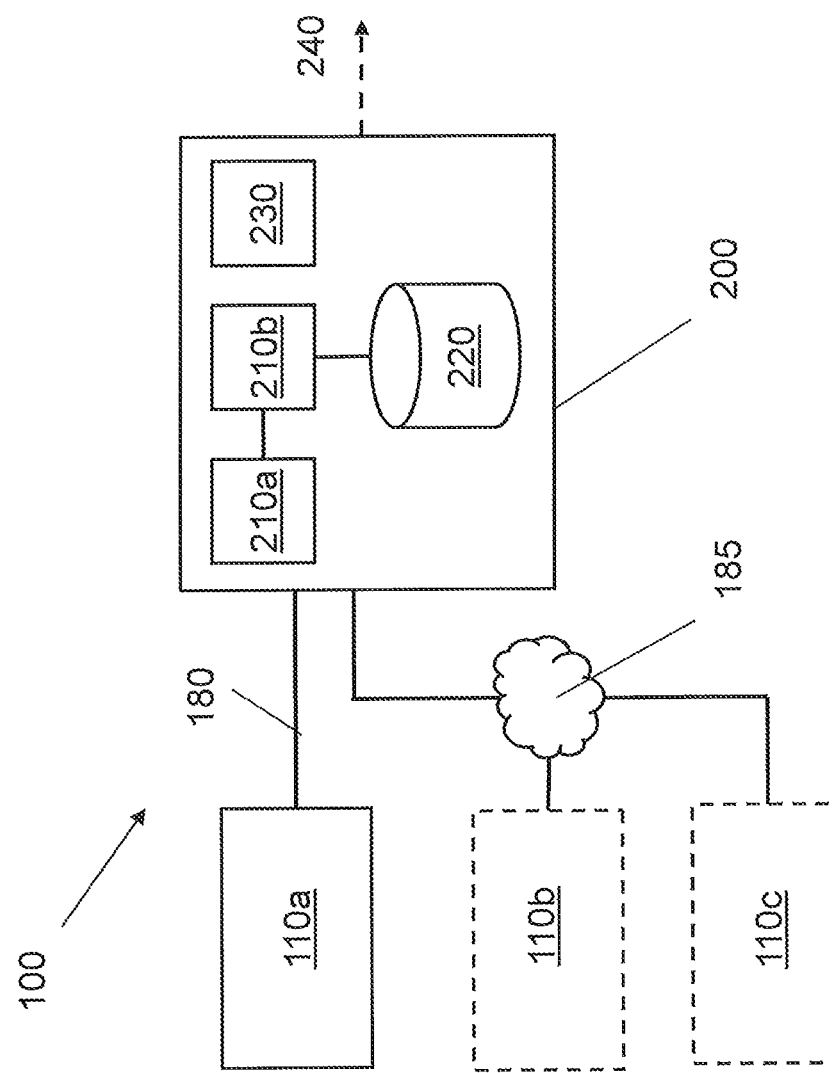
FIG. 5 shows the landing string system comprising measurement device and monitoring system.

FIG. 5 shows a simplified representation of the landing string system 100 additionally comprising a monitoring system 200. Here, the monitoring system 200 comprises a processor module 210a and a memory module 210b, configured in a known manner, and in communication with one another. Here, the monitoring system 200 further comprises a database 220 (in some alternative examples the monitoring system may be in communication with an external database).

Here, the database 220 is configured to store at least mechanical-condition data associated with one or more landing strings. In use, the monitoring system 200 is in communication with a least a first measurement device 110a, and configured to receive (for example, download and/or store) obtained mechanical-condition data, for example, from the data-storage device 150 of that measurement device 110a. For ease of explanation below, the monitoring system 200 will be described with reference to a first measurement device 110a, but it will be appreciated that the monitoring system 200 may be in communication (or configured to receive data from) a plurality of measure devices (for example, 110b, 110c).

In some examples, the monitoring system 200 may be provided in proximity to the measurement device 110a and/or data-storage device 150 (for example, being provided at the body section 120). However, as described here, the monitoring system is remotely located (for example, at surface 20 or indeed at shore). Here, the monitoring system 200 is configured to receive mechanical-condition data via a communication connection that is wired 180 (which includes optical). However, in other examples wireless, or combination thereof (e.g. over a network 185) may be used.

Wireless, in this context, includes methods of communication that comprise non-electromagnetic signals, such acoustics or other such pressure pulses (e.g. within the landing string). Further, the monitoring system may be configured to connect, after use, with a particular measurement device 110 so as to download data accumulated during service.

In some examples, where the monitoring system 200 downloads mechanical-condition data obtained from the sensors/data-storage device, the system 200 may subsequently calculate, approximate, or estimate, —for example regressively determine as above—mechanical conditions at other regions associated with the body section of the measurement device (e.g. "local data"). Such local data may be associated with a particular measurement device 110. Other parameters associated with the use of that particular measurement device 110a may be stored, such a temperature during service, time of service, pressure, etc. The measurement device 110, or indeed the landing string 10 to which the measurement device is interfaced, may comprise a unique identifier (i.e. a landing string ID). All data determined or calculated in relation to that particular landing string may be associated with that particular landing string ID in the database 220.

In some examples, the monitoring system 200 can be configured to determine calculate, approximate, or estimate, —for example regressively determine—mechanical conditions at regions beyond the measurement device 110a. Such analysis may provide "global data". That is to say, global data may be considered to be data associated with the mechanical conditions of the landing string at and/or beyond the body section 120 of the measurement device 110a. For example, in some cases, where the body section 120 of the measurement device 110a has been positioned, in service, at a region of expected peak tension, bending, or the like, then the monitoring system 200 may be configured to assign, and store, the same or similar peak mechanical conditions as global data to the remainder of that landing string (i.e. to the landing string ID in the database 200). Similarly, where the body section 120 of the system 100 is positioned, in service, at a region of reduced local mechanical conditions, compared to the global conditions, then the monitoring system 200 may be configured to calculate, approximate or estimate global data based on the mechanical conditions observed locally. In some cases, this may include assigning a particular weighting to the sensed mechanical conditions so as to provide global data.

One example of this may be where the measurement device 110 is integrated at a region on the landing string 10 which is expected to be double the tension/compression/bending of the remainder of the string 10. In such cases, the global data may be weighted (by 0.5) to suggest that the remainder of the landing string has experienced half the forces, or the like.

Either way, upon receipt of mechanical-condition data from a particular measurement device 110a-which may also be communicated in the form of local/global data—the monitoring system 200 is configured to use that received mechanical-condition data together with one or more threshold conditions to provide an indication of the as to suitability of service of that particular landing string 10. The threshold conditions may include absolute magnitude values (e.g. maximum tension, bending etc.). The threshold conditions may include cumulative values (e.g. maximum hours of service at, or above, a particular tension bending).

The table below shows two exemplary excerpts of database records associated with a particular unique landing string ID.

| Component ID | S/N 1234567-1-1 |
|---|---|
| Total time in Service | 800 hrs |
| Total Cumulative damage | 80% |
| Total no. of deployments | 10 |
| Suitability for service | Green/Red |
| Deployment no. 10 | |
| | |
| System reference | TX1234-001 |
| Current time in Service | 30 hrs |
| Number of threshold Exceedance Events | 0 |
| Cumulative Damage | 3% |
| Asset Load Source | TAR-1234 |
| Number of Load Points | 1,080,000 (1, 2, 3, . . . ) |
| Load Point 1 | |
| | |
| Tension | 25,000 lbf |
| Bending | 30,000 in lbf |
| Pressure | 8,000 psi |
| Temperature | 80° C. |
| Thresholds | 0 |
| Load Point 2 . . . | |
| | |
| Current time in Service | 30 hrs |
| Total time in Service | 800 hrs |
| No. of deployments | 10 |
| Current maximum tension (Local) | 35,000 lbf |
| Current maximum tension (Global) | 60,000 lbf |
| Threshold Tension (Local/Global) | 100,000 lbf |
| No. of times 0.5 threshold exceeded during lifespan (local/global) | 2 |
| Threshold of times (local/global) | 60 sec |
| Current maximum bending (Local) | 65,000 in lbf |
| Current maximum bending (Global) | 90,000 in lbf |
| Threshold Bending (Local/Global) | 150,000 lbf |
| No. of times 0.5 threshold exceeded during lifespan (local/global) | 3 |
| Threshold for times (local/global) | 5 sec |
| Suitability of service | Green/Red |

Here, the monitoring system 200 further comprises a user interface 230, configured to provide a user with the ability to augment or input data. Similarly, the user interface 300 permits a user to be visually informed or notified as to the suitability of one or more particular landing strings 10.

For example, in use—or even subsequent to use—a user is able to use the monitoring system (e.g. access a particular landing string data record) and confirm, not simply based on the number of hours in service, but also on the particular conditions that a landing string 10 may have experienced, as to whether that landing string 10 may remain suitable for service, or indeed how many hours and/or in what further conditions the landing string 10 may be used. This may assist in deployment and maintenance planning, or the like.

In some examples, the system 200 may additionally or alternatively be configured to initiate an action event, for example, after a determining suitability of service. For example, after comparing one or more threshold conditions with mechanical-condition data, the system 200 can be configured to communicate an action signal 240. The action signal 240 may be communicated from the system 200 when a threshold condition has been exceeded, or is expected to be exceeded (or indeed when a threshold condition is close to being exceeded).

In particular examples, the action signal 240 can be communicated to the landing string (or systems associated with the landing string) so as to initiate a shut down at the landing string 10. Such an initiated shutdown may close valves to shut-in well bore fluid, and then disconnect from the well. In such a manner, and during unacceptable conditions, the landing string 10 may be able to safety detach from the seabed, or the like, without damage or pollution.

The system 200 may also be configured to communicate, for example display, an action event to a user at the user interface 230. In some cases, the system 200 may require user authorization in order to initiate an action event, such as a shut down. However, the system 200 may additionally or alternatively provide a user with recommendations for subsequent use. For example, it may provide the user with a "live" update as to the time of service remaining for a particular landing string (e.g. has not to be used for more than 48 hours).

Where the system 200 is able to provide an action signal, or at least is configured to initiate an event, the system 200 and measurement device 110 may be used in "real time". That is to say that the monitoring system 200 may be configured to monitor the measurement device 110 at time intervals that are appropriately spaced so as to capture any threshold events. In some cases, this may be considered to be monitoring continuously.

In further examples still, the monitoring system 200 may be configured to use mechanical-condition data—which may be in the form of local and/or global data—to provide an indication as to suitability of service of a different particular landing string (e.g. updating records of a different landing string ID, or group of landing strings). For example, and as mentioned above, in some cases the measurement device 110 of a particular landing string 10 may be configured to monitor temperature and/or pressure of environmental conditions, and/or indeed temperature/pressure of fluids within the landing string 10. In such cases, that data may be compiled together with other mechanical-condition data obtained from the mechanical sensors 130 in order to store and assess against particular thresholds.

In some examples, the temperature and/or pressure measured may be associated with different landing strings, attached to which are measurement device without such capability, but nevertheless are expected to experience similar environmental conditions.

Further, the system 200 may be configured to compare one or more threshold values with mechanical-condition data from a particular landing string 10 (e.g. a first landing string deployed in a particular region), and then associate a determined or calculated suitability of service with further landing strings (e.g. deployed in a second region), which may or may not be equipped with similar measurement devices). Such further landing strings may have been assessed to have been deployed in the same of similar environment for the same or similar duration.

Use of data in this manner may help reduce costs of monitoring multiple landing strings.

It will be appreciated that the above described systems and methods may permit monitoring and/or measurement of "in service" components, which may assist with maintenance, safety, design verification, etc.

In some examples, aspects of the systems may be provided by processing apparatus such that, when programmed with a computer program product, provide the methods described. Some of the above examples may implement certain functionality by means of software, but also that functionality could equally be implemented solely in hardware (for example by means of one or more ASICs (application specific integrated circuit) or Field Programmable Gate Arrays (FPGAs)), or indeed by a mix of hardware and software (e.g. firmware). As such, the scope of aspects of the present disclosure should not be interpreted as being limited only to being implemented in software or indeed hardware.

For those systems or components described herein as having a processing apparatus (e.g., processor module), the aforesaid processing apparatus device may include any type of computing device, computational circuit, or any type of process or processing circuit capable of executing a series of instructions that are stored in memory. The processing apparatus may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. Embodiments of a data-storage device as described herein may be a non-transitory computer readable storage medium configured to store instructions that when executed by a processing apparatus, cause the processing apparatus to perform or cause the performance of certain functions and/or methods described herein. Embodiments of the data-storage devices described herein may be a single memory device or a plurality of memory devices, any device that stores digital information and are therefore not limited to any particular type of memory unless so stated herein, and may include both volatile and non-volatile memory. Any system or component described herein as performing functions and/or methods may also include such a processing apparatus. The instructions stored in memory may represent one or more algorithms for performing the functions and/or methods described herein, and the stored instructions are not limited to any particular form provided they can be executed by the processing apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the invention may consist of any such individual feature or combination of features. In view of the foregoing description it will be evident to a person skilled in the art that various modifications may be made within the spirit and scope of the invention.

What is claimed is:

1. A landing string system for determining a suitability of service for a particular landing string and/or a group of landing strings, comprising:
   a measurement device comprising one or more mechanical sensors configured to observe mechanical conditions associated with a landing string;
   a data-storage device in communication with the measurement device, the data storage device configured to store, from time to time, mechanical-condition data associated with the observed mechanical conditions for at least an expected time in service of the landing string;
   a power assembly configured to provide power to the data-storage device for at least the expected time in service of the landing string; and
   a monitoring system in communication with the data-storage device and configured to receive stored mechanical-condition data from over the time in service, and to determine the suitability of service of a particular landing string, and/or a group of landing strings based on that stored mechanical-condition data.

2. The landing string system according to claim 1, further comprising a main body portion or section configured as an intermediate joint to couple or connect to a said landing string.

3. The landing string system according to claim 1, wherein the landing string system is integrally formed with the landing string as a landing string assembly.

4. The landing string system according to claim 1, wherein the measurement device comprises mounting components spaced along a body portion, and the one or more mechanical sensors are coupled or otherwise fixed between the mounting components of the measurement device.

5. The landing string system according to claim 4, wherein the mounting components are configured as flange portions extending radially from the body portion, and are rigidly fixed with respect to the body portion.

6. The landing string system according to claim 1, wherein the measurement device comprises at least first and second sensor arrangements, both of the sensor arrangements configured to measure mechanical conditions associated with a said landing string.

7. The landing string system according to claim 6, wherein the first sensor arrangement has a first particular measurement range and the second sensor arrangement has a second particular measurement range the first range being smaller than the second range and lying within the second range.

8. The landing string system according to claim 6, wherein the first sensor arrangement has a first particular measurement range and the second sensor arrangement has a second particular measurement range, the first and second ranges being the same, or substantially the same.

9. The landing string system according to claim 6, wherein the data-storage device comprises a first data store and a second data store, the first and second data stores being communication with first and second sensors arrangements, respectively.

10. The landing string system according to claim 6, wherein the data-storage device comprises a first data store and a second data store, each data store being communication with both first and second sensors arrangements, and configured to store data from each sensor cumulatively.

11. The landing string system according to claim 1, wherein the mechanical sensors are configured to measure strain.

12. The landing string system according to claim 1, wherein the sensors and/or data-storage devices are housed within an outer casing surrounding some of all of a body section of the measurement device.

13. The landing string system according to claim 1, wherein the monitoring system is configured to use mechanical-condition data obtained from the sensors/data-storage device to determine and store mechanical conditions at other regions associated with a body portion of the measurement device in order to provide an indication as to suitability of service.

14. The landing string system according to claim 1, wherein the monitoring system is configured to determine and store mechanical conditions at regions beyond the measurement device in order to provide an indication as to suitability of service.

15. The landing string system according to claim 1, wherein the landing string system comprises a plurality of measurement devices, each of those measurement devices being in communication with one or more monitoring systems.

16. The landing system of claim 1, wherein the monitoring system is configured to confirm, using the mechanical-condition data together with one or more threshold conditions, at least one of:
   whether the particular landing string and/or group of landing strings remains suitable for service;
   how many hours the particular landing string and/or group of landing strings may be used; and
   in what further conditions the particular landing string and/or group of landing strings may be used.

17. A method of measuring mechanical-condition data associated with a landing string, comprising:
   observing mechanical conditions associated with a landing string using a measurement device comprising one or more mechanical sensors;
   storing, from time to time, mechanical-condition data at a data-storage device for at least an expected time in service of the landing string; and
   using the stored mechanical-condition data from over the time in service to determine a suitability of service of a particular said landing string and/or a group of said landing strings based on that stored mechanical-condition data.

18. A method for determining a suitability of service of one or more landing strings, comprising:
   obtaining mechanical-condition data from a landing string measurement device, the mechanical-condition data having been obtained, from time to time, during at least an expected time in service of a landing string, from one or more sensors configured to observe the mechanical condition indicative of the landing string;
   storing the obtained mechanical-condition data for at least the expected time in service of the landing string; and
   using the stored mechanical-condition data from over the time in service together with one or more threshold conditions to determine the suitability of service of the landing string based on that stored mechanical-condition data.

19. The method according to claim 18, further comprising using local data that is indicative of the mechanical condition at the measurement device in order to provide an indication as to suitability of service of a said landing string.

20. The method according to claim 18, further comprising using global data obtained from a measurement device that is indicative of the mechanical condition beyond the measurement device, in order to provide an indication as to suitability of service of a said landing string.

21. The method according to claim 18, wherein the threshold conditions include absolute magnitude values.

22. The method according to claim 18, wherein the threshold conditions include cumulative values.

23. The method according to claim 18, further comprising providing to a user, via a user interface, the suitability of one or more particular landing strings.

\* \* \* \* \*